US011919762B2

(12) United States Patent
Carillo et al.

(10) Patent No.: US 11,919,762 B2
(45) Date of Patent: Mar. 5, 2024

(54) ROTARY CAPSULE DISPENSER FOR BOTTLING LINES

(71) Applicant: ROBINO & GALANDRINO S.P.A., Alessandria (IT)

(72) Inventors: Flavio Carillo, Canelli (IT); Mario Luigi Bianco, Canelli (IT)

(73) Assignee: ROBINO & GALANDRINO S.P.A., Alessandria (IT)

( * ) Notice: Subject to any disclaimer, the term of this patent is extended or adjusted under 35 U.S.C. 154(b) by 0 days.

(21) Appl. No.: 17/761,681

(22) PCT Filed: Sep. 15, 2020

(86) PCT No.: PCT/EP2020/075699
§ 371 (c)(1),
(2) Date: Mar. 18, 2022

(87) PCT Pub. No.: WO2021/052927
PCT Pub. Date: Mar. 25, 2021

(65) Prior Publication Data

US 2022/0340405 A1 Oct. 27, 2022

(30) Foreign Application Priority Data

Sep. 19, 2019 (IT) ........................ 102019000016667

(51) Int. Cl.
*B67B 5/03* (2006.01)

(52) U.S. Cl.
CPC .................................... *B67B 5/03* (2013.01)

(58) Field of Classification Search
CPC ..... B67B 5/03; B67B 3/06–0645; B67B 5/00; B65B 7/2807; B65B 7/2835; B65G 47/846

(Continued)

(56) References Cited

U.S. PATENT DOCUMENTS 3,374,605 A * 3/1968 Satchwell ................ B67B 3/06 29/785
4,238,267 A 12/1980 Konstantin
(Continued)

FOREIGN PATENT DOCUMENTS

IT PD20070345 A1 4/2009

OTHER PUBLICATIONS

International Search Report dated Dec. 23, 2020 re: Application No. PCT/EP2020/075699, pp. 1-3, citing: US 3 374 605 A, US 4 238 267 A and IT PD20 070 345 A1.
(Continued)

*Primary Examiner* — Anna K Kinsaul
*Assistant Examiner* — Luis G Del Valle
(74) *Attorney, Agent, or Firm* — CANTOR COLBURN LLP

(57) ABSTRACT

A capsule dispenser for bottling lines includes a motorized wheel with a horizontal axis supports sockets provided with an open end, which follow one another in receiving respective capsules in a capsule loading position and expelling them in a capsule releasing position. Their open ends are directed outward between these positions. A duct supplied with pressurized air has an arched profile about the axis of the wheel and extends externally to the sockets between the capsule loading position and the capsule releasing position. The duct has a tube which, at a lower end, bifurcates into two branches, between which the neck of the bottle is inserted just before the application of the capsule, and is provided with holes directed inwardly to blow air in the direction of the open end of the sockets.

10 Claims, 9 Drawing Sheets

(58) Field of Classification Search
USPC .......................... 53/287, 308, 313; 198/781.1
See application file for complete search history.

(56) References Cited

U.S. PATENT DOCUMENTS

| | | | | |
|---|---|---|---|---|
| 2006/0086065 | A1* | 4/2006 | Tomalesky | B67C 7/0033 53/425 |
| 2007/0157563 | A1* | 7/2007 | Ruppman | B67C 3/222 53/287 |
| 2011/0220124 | A1* | 9/2011 | Vaska | A61M 16/0463 128/848 |

OTHER PUBLICATIONS

IT Search Report dated Jun. 5, 2020 re: Application No. 201900016667, pp. 1-7, citing: US 3 374 605 A, US 4 238 267 A and IT PD20 070 345 A1.

* cited by examiner

ROTARY CAPSULE DISPENSER FOR BOTTLING LINES

TECHNICAL FIELD

The present disclosure relates to a rotary capsule dispenser for bottling lines.

BACKGROUND

As is known, a generic bottling line for alcoholic beverages such as wines, sparkling wines, champagnes and beers, or nonalcoholic beverages such as water, oil, carbonated drinks, and the like, can comprise a series of stations adapted to perform one or more specific operations on rigid containers, typically bottles received in succession.

The capsule dispenser has the purpose of fitting onto the neck of the already filled and capped bottle a sealing capsule in a loose configuration. The sealing capsule can be made of a plastically deformable material, e.g., a polylaminated aluminum sheet in the case of sparkling wines, or tin in the case of high-value distillates such as cognac and whiskey or wines of high quality. In the case of medium or medium-low range wines, the capsule is normally made of heat-shrink plastic material.

After the capsule has been fitted onto the neck of the bottle, it is caused to adhere to the wall of the bottle by means of bending and smoothing or rolling operations or by heating, depending on the material of the capsule. These operations are beyond the aim and objects of the present disclosure and therefore will not be discussed here in detail.

During the dispensing of the capsules, the bottles are caused to advance by a conveyance device, e.g., a motorized screw feeder or a motorized belt.

The dispenser can comprise a motorized wheel with a horizontal axis which is arranged above the conveyance device and rotates synchronously therewith. The wheel supports peripherally a series of capsule supporting sockets, which pick up in succession the capsules from a stack and expel them by means of a pneumatic jet onto the bottles that advance below them.

In order to prevent the capsule from falling by the force of gravity before it is perfectly aligned with the neck of the bottle, various kinds of capsule retention systems are known.

A first known capsule retention device comprises an elastic lamina, which is accommodated in the socket and is pressed against the side wall of the capsule so as to retain it inside the socket by friction.

This system has the drawback that especially in the case of painted tin capsules, during expulsion the elastic lamina can score the side wall of the capsule, compromising the quality of the product.

Another known capsule retention device comprises a pin which is inserted within the socket, just below the lower edge of the capsule, and moves radially, e.g., under the actuation of cam means, between a more internal position, in which it obstructs the open end of the socket, and a more external position, in which it leaves the capsule free to exit.

This system has the drawback that especially in the case of capsules made of polylaminated aluminum or tin, the lower rim of the capsule, in the region of contact with the pin, can be dented and can bend inward. This circumstance compromises both the quality of the product and the correct insertion of the capsule on the neck of the bottle, since the inward bending of the rim of the capsule constricts the passage for the neck during insertion.

SUMMARY

In view of the above, the aim of the present disclosure is to provide a rotary capsule dispenser for bottling lines equipped with a capsule retention device that is capable of retaining effectively and reliably the capsule until the moment of expulsion, without however engaging the capsule with mechanical elements that could damage and/or deform it.

This aim and other advantages, which will become more apparent hereinafter, are achieved by a rotary capsule dispenser having the characteristics described in claim 1, while the dependent claims define other advantageous albeit secondary characteristics of the disclosure.

BRIEF DESCRIPTION OF THE DRAWINGS

The disclosure is now described in greater detail with reference to some preferred but not exclusive embodiments thereof, illustrated by way of nonlimiting example in the accompanying drawings, wherein.

DETAILED DESCRIPTION OF THE DRAWINGS

Figure 1:
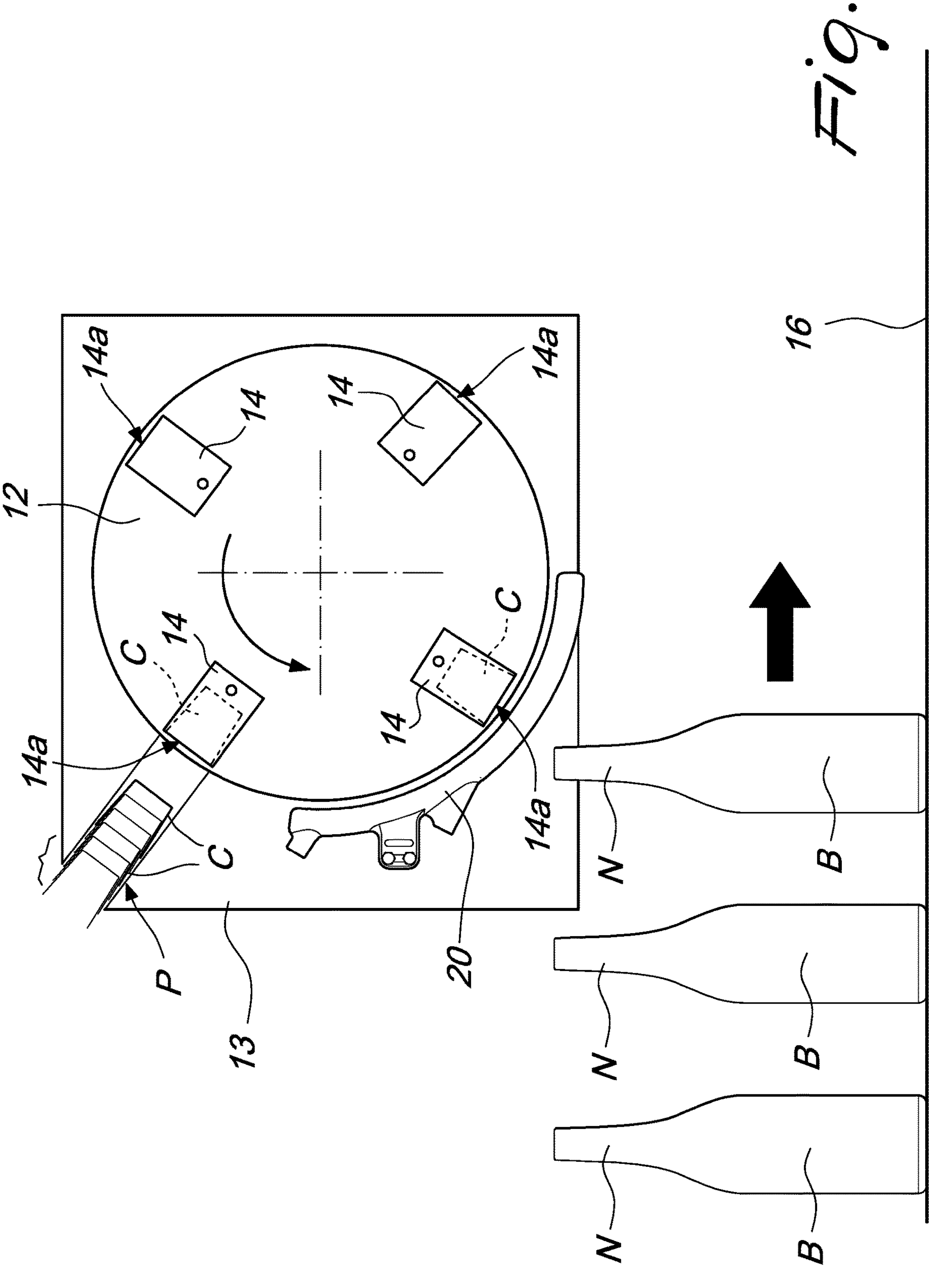
FIG. 1 is a schematic lateral elevation view of a rotary capsule dispenser according to the disclosure in a first operating position.
Figure 2:
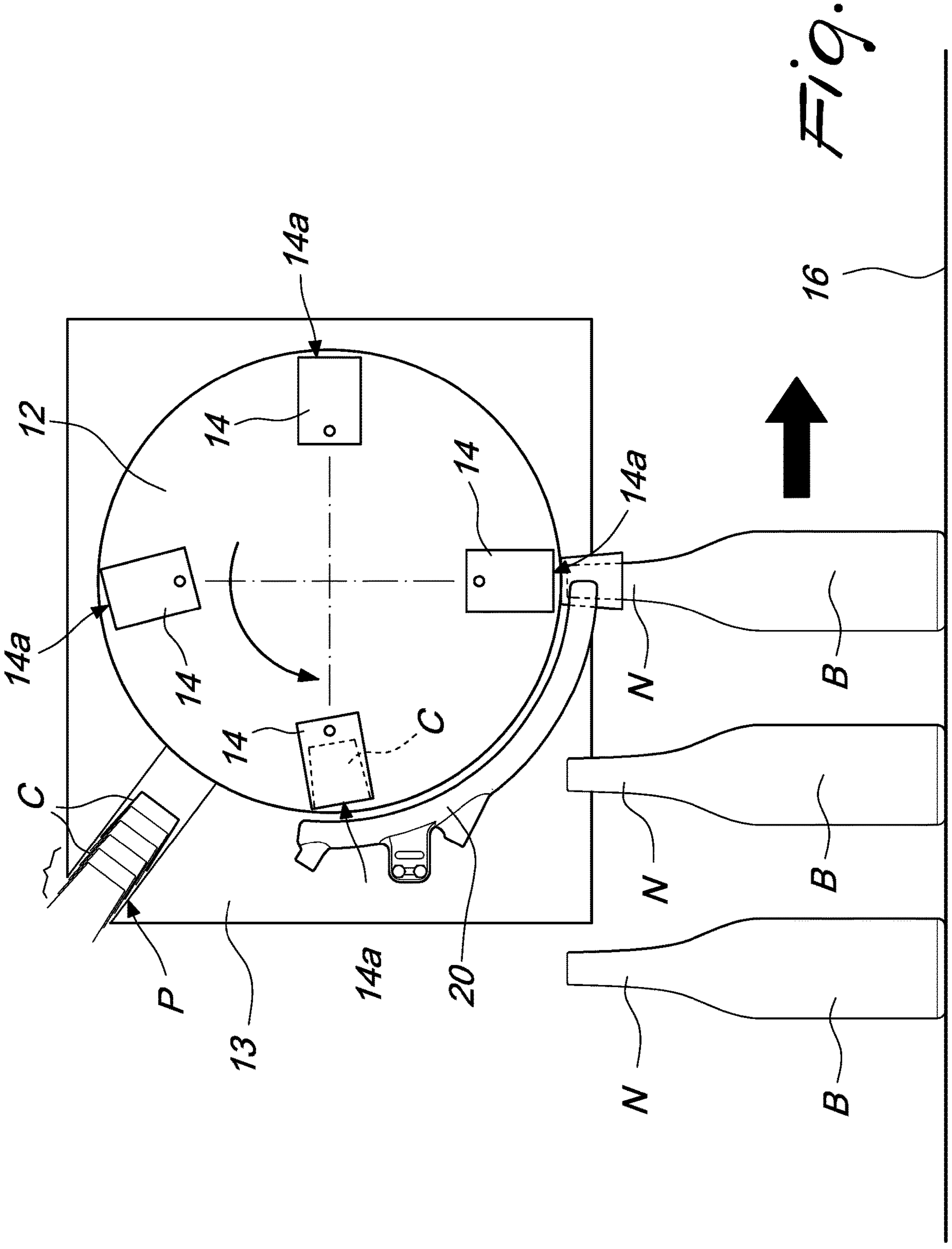
FIG. 2 is a schematic lateral elevation view of a rotary capsule dispenser according to the disclosure in a second operating position.
Figure 3:
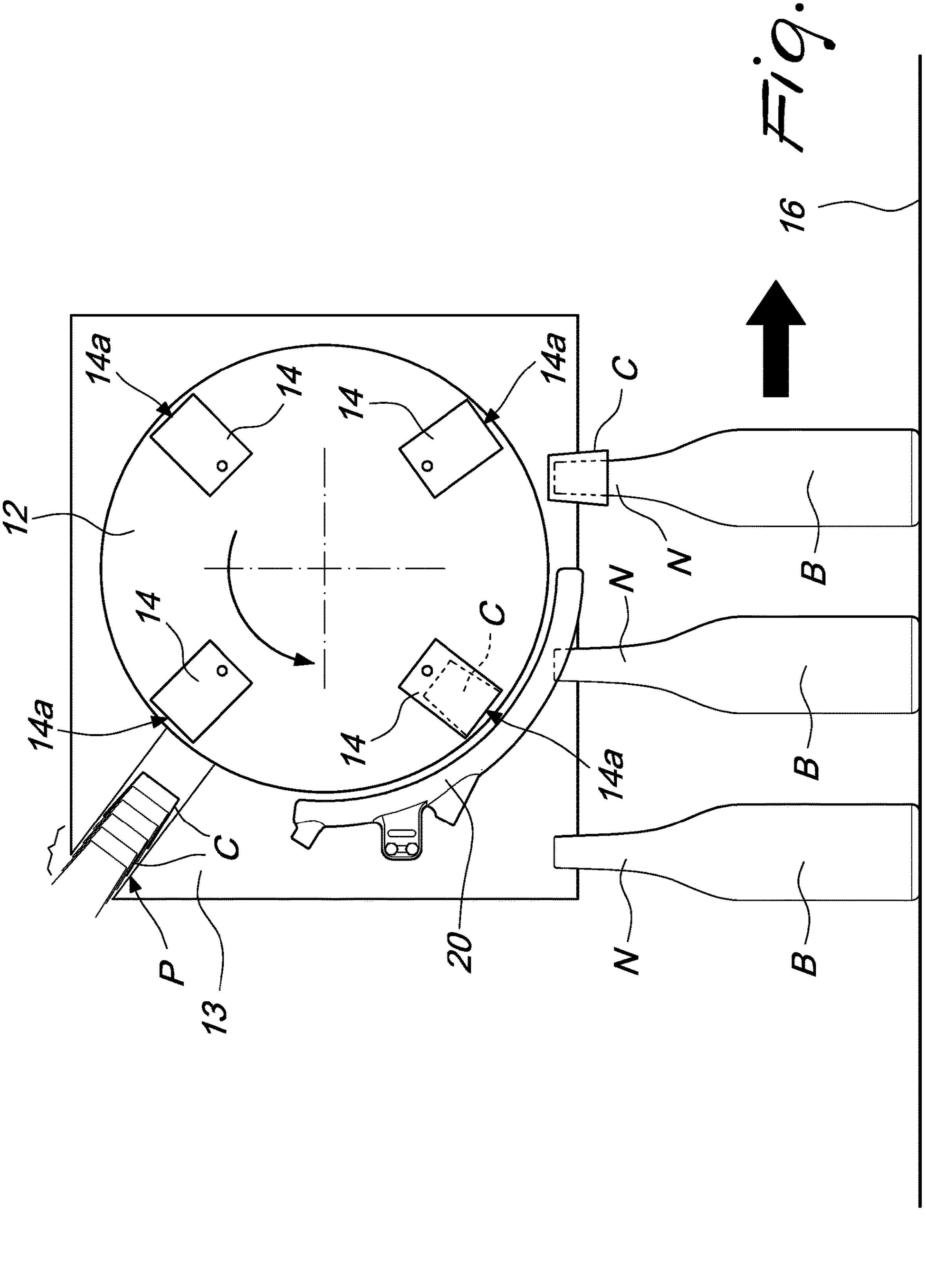
FIG. 3 is a schematic lateral elevation view of a rotary capsule dispenser according to the disclosure in a third operating position.
Figure 4:
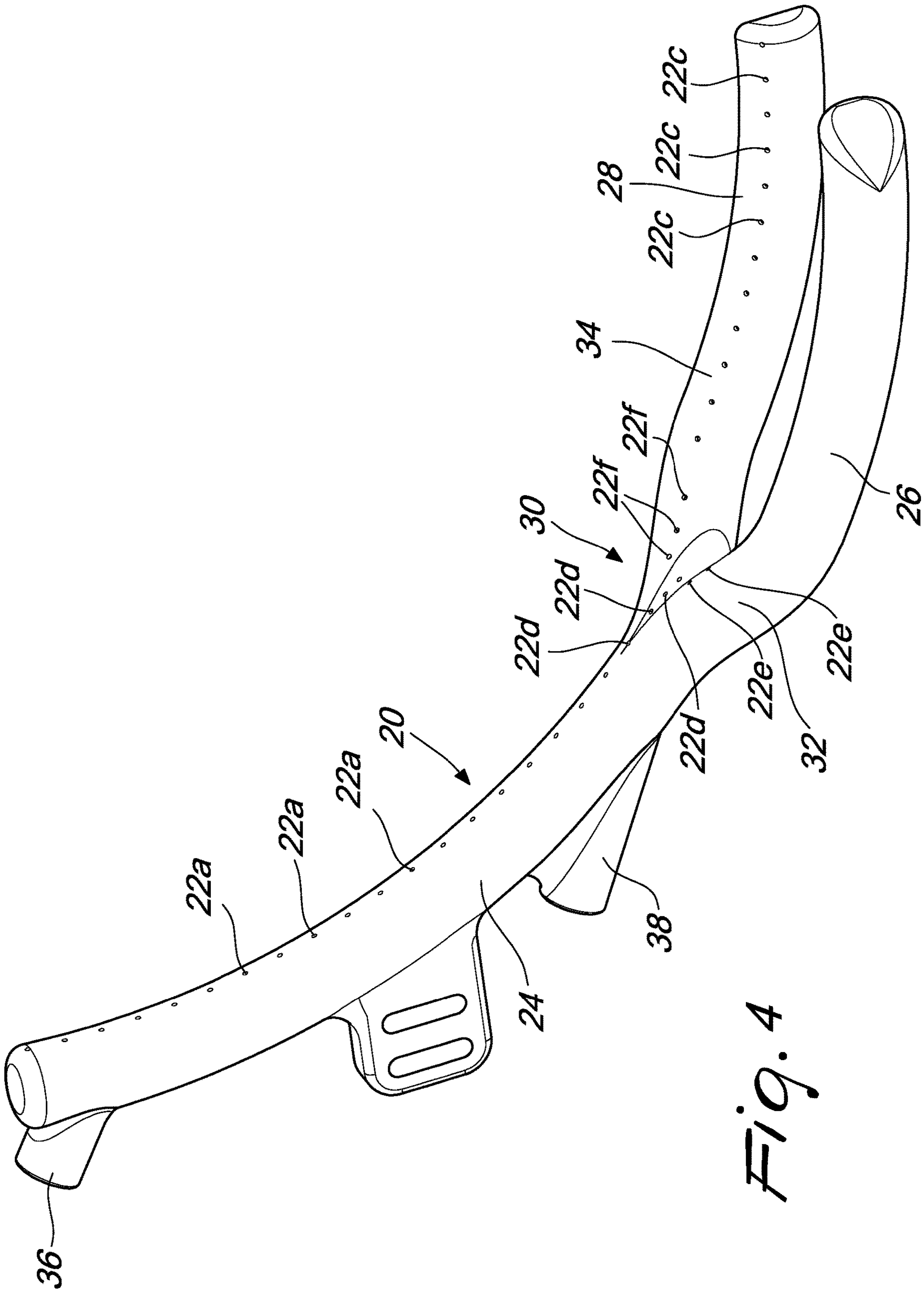
FIG. 4 is a detailed perspective view of a component of the dispenser of FIG. 1.
Figure 6:
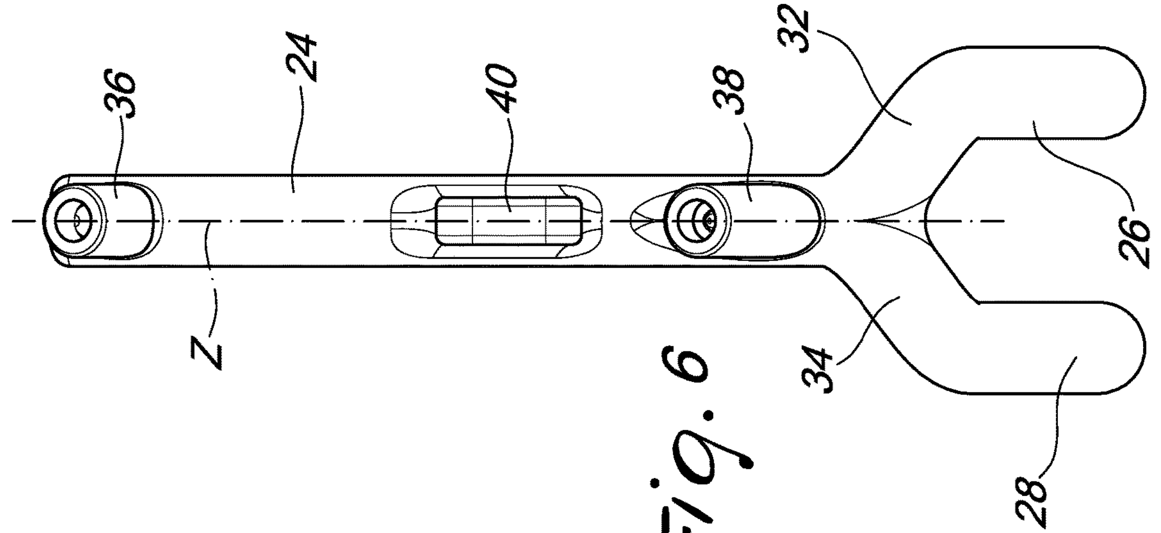
FIG. 6 is a rear elevation view of the component of FIG. 4.
Figure 5:
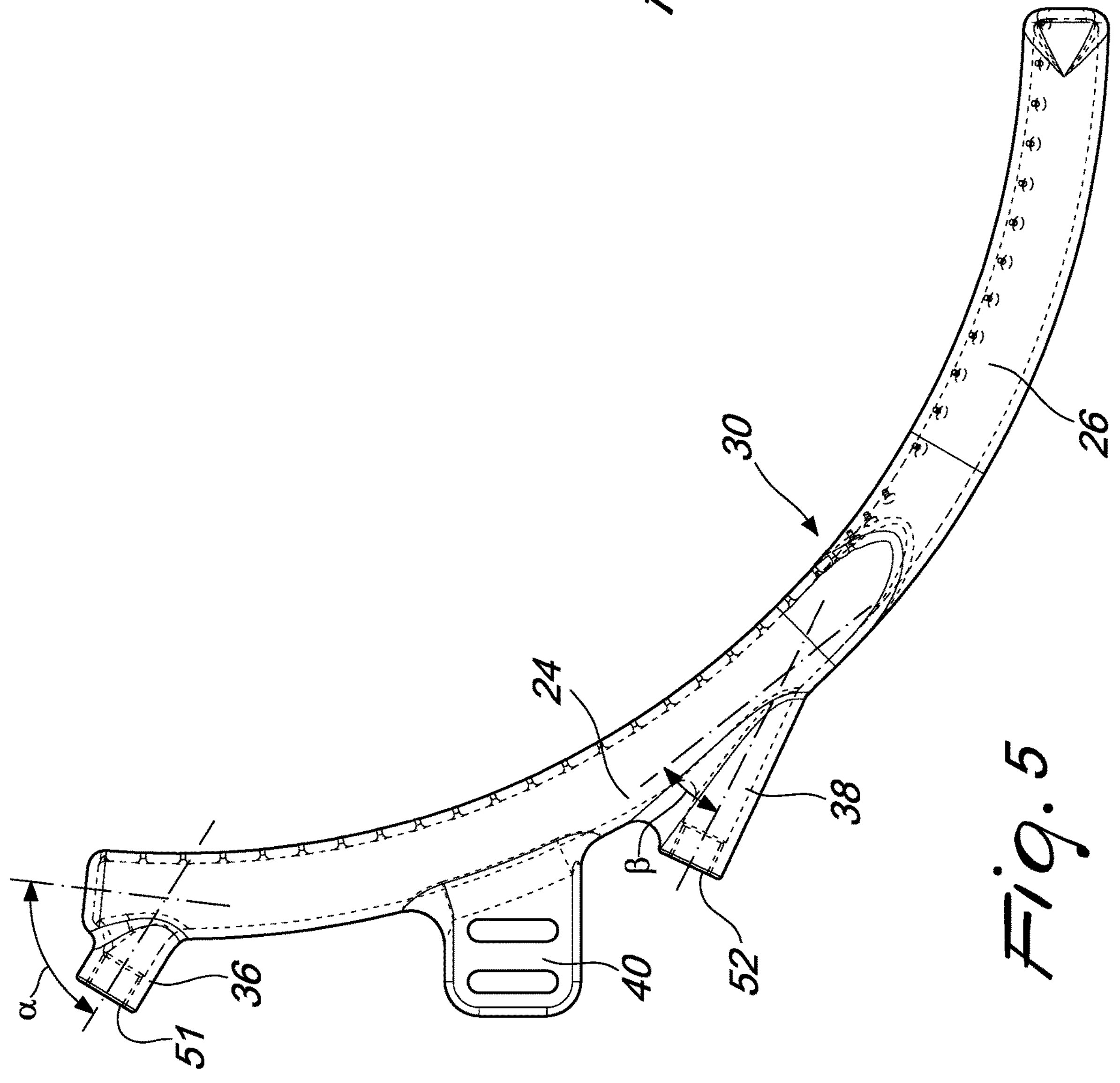
FIG. 5 is a lateral elevation view of the component of FIG. 4.
Figure 7:
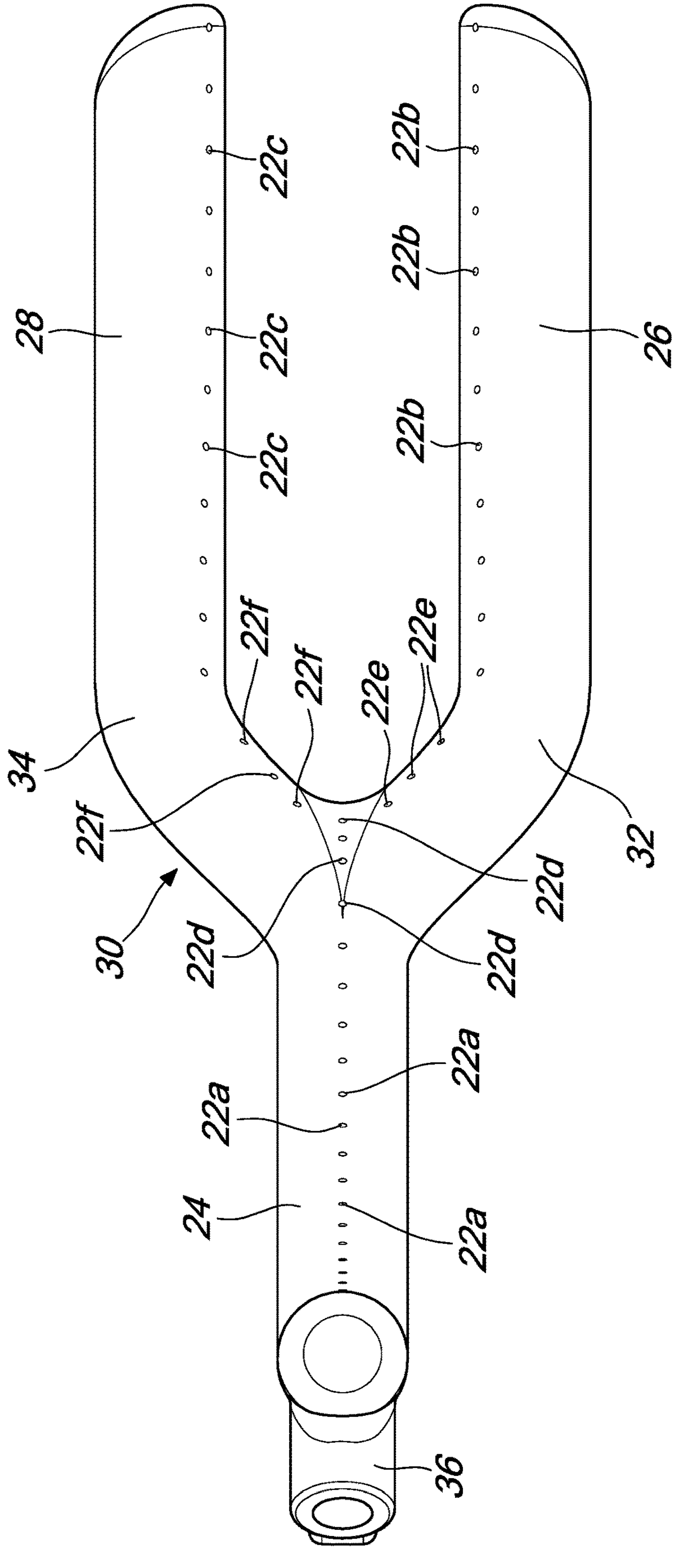
FIG. 7 is a plan view of the component of FIG. 4.
Figure 8:
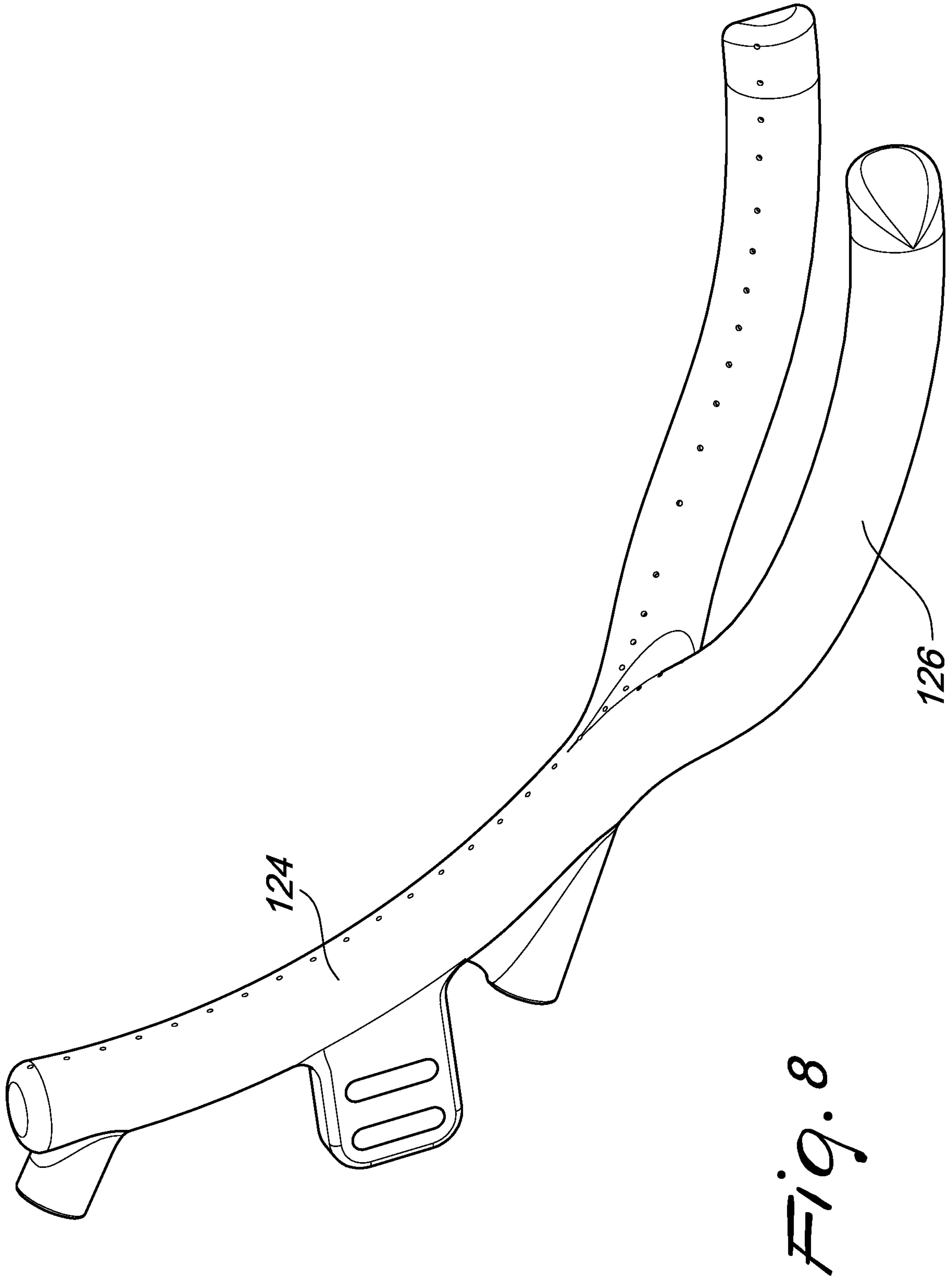
FIG. 8 is a detailed perspective view of a component of the dispenser according to the disclosure in an alternative embodiment.
Figure 10:
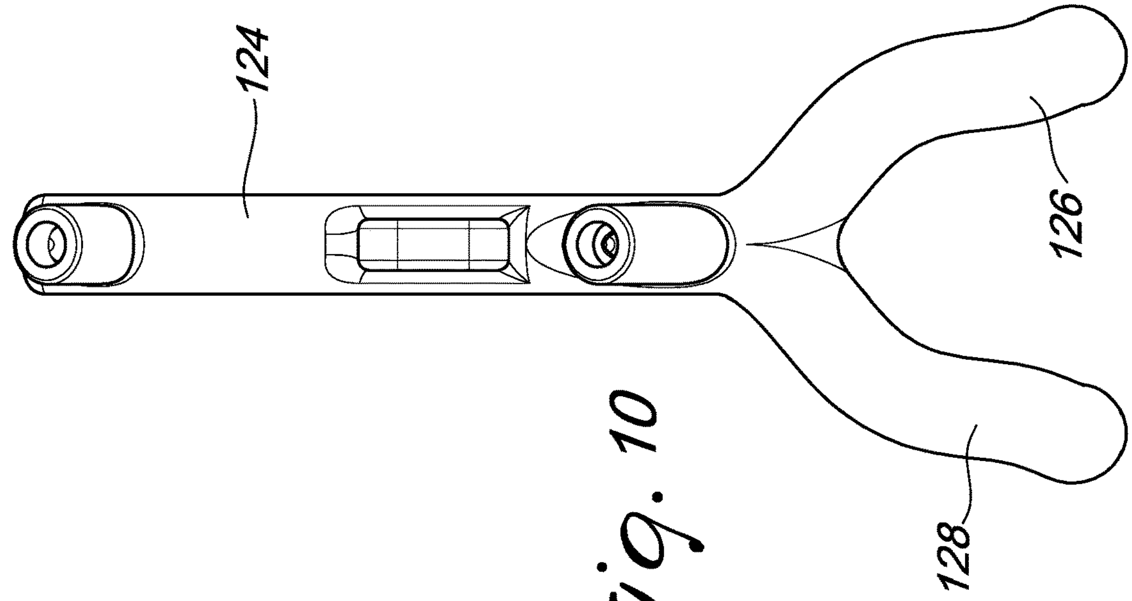
FIG. 10 is a rear elevation view of the component of FIG. 7.
Figure 9:
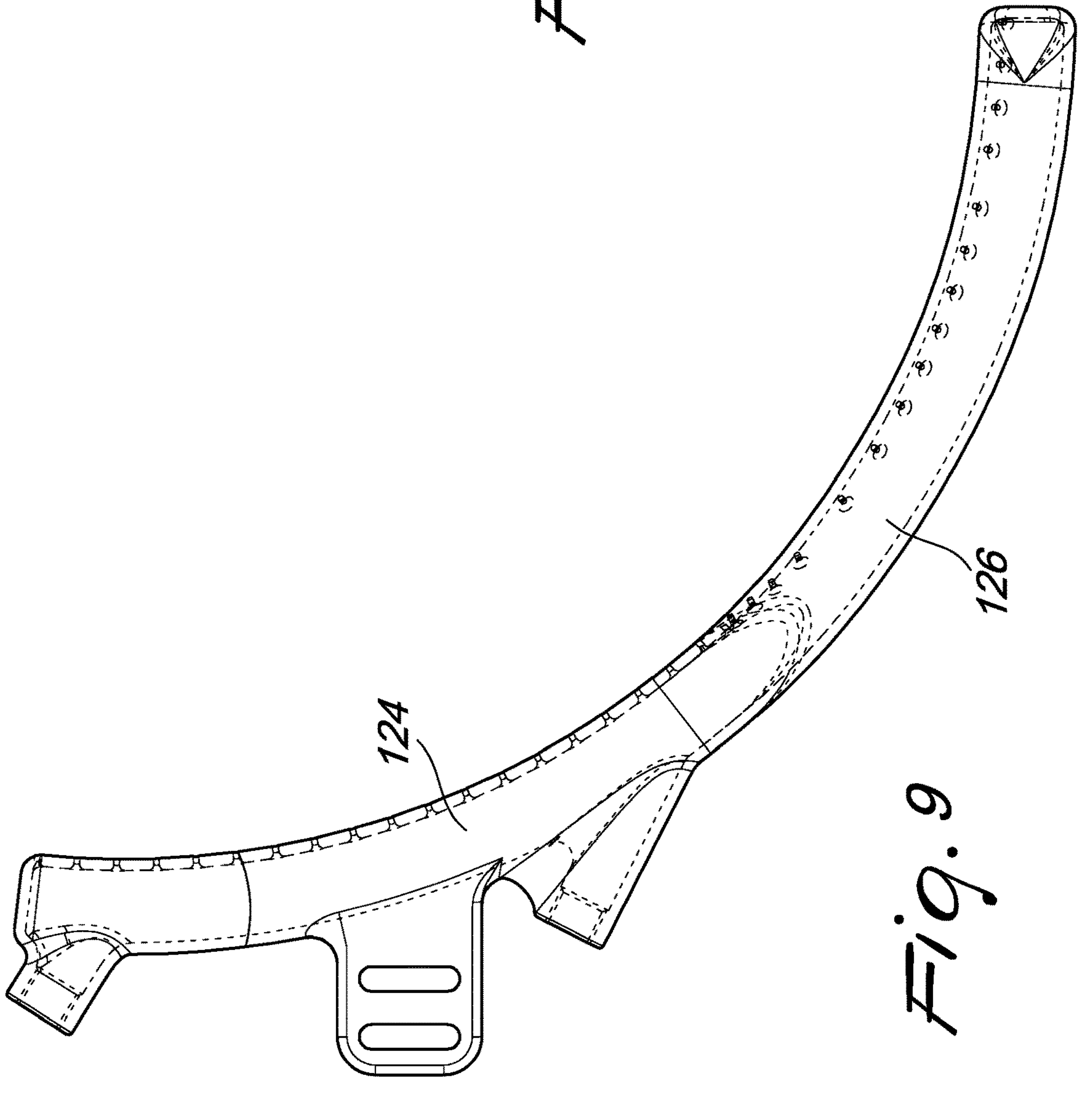
FIG. 9 is a lateral elevation view of the component of FIG. 7.
Figure 11:
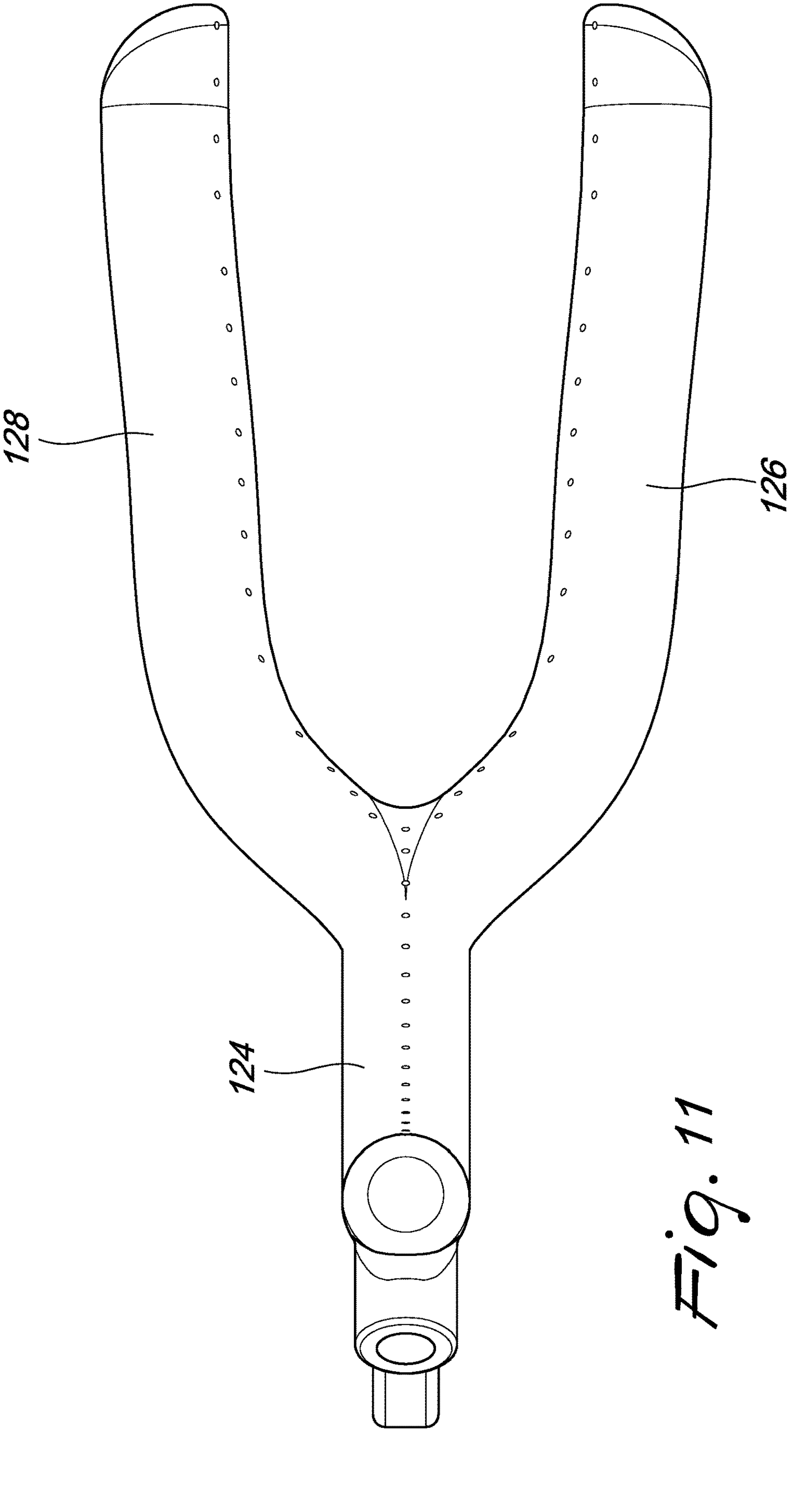
FIG. 11 is a plan view of the component of FIG. 7.

Initially with reference to FIGS. 1-3, a rotary capsule dispenser 10 comprises a wheel 12 which is supported rotatably about a horizontal axis by a frame 13 and is turned by motor means (not shown).

In the embodiment described here, the wheel 12 supports peripherally four sockets 14. The sockets 14 are arranged so that their axes lie on a vertical plane that is perpendicular to the axis of the wheel and have an open end 14*a*.

During the rotation of the wheel 12, the sockets 14 follow one another in receiving respective capsules C from a stack P in a capsule loading position (FIG. 1). Once a capsule release position has been reached (FIG. 2), the capsules are expelled pneumatically in succession onto the necks N of a row of bottles B which are advanced below the dispenser 10 by conveyance means, such as a motorized screw feeder or a conveyor belt. The conveyance means are identified schematically by the numeral 16 in the figures so as to indicate the plane of advancement of the bottles.

The wheel 12 and the conveyance means 16 move synchronously and continuously, so that the bottles B and the sockets 14 are always moving during the expulsion of the capsule C onto the neck N of the bottle B.

In order to facilitate the insertion of the capsule, in a manner known per se, the sockets 14 are supported so that they can rotate with respect to the wheel 12 about respective horizontal axes which are parallel to the rotation axis of the wheel 12, under the actuation of lever systems which are designed so as to arrange the socket 14 with its open end 14*a* oriented vertically downward with a certain advance with respect to the capsule release position. In the portion comprised between the capsule loading position and the capsule release position, the open ends 14*a* of the sockets 14 are directed outward in a substantially radial direction.

The lever systems are neither shown nor described in detail herein since, as has been mentioned, they are known per se and are beyond the aim and objects of the present disclosure. An example of an embodiment is described in Italian patent no. 1160952 in the name of this same applicant.

The dispenser 10 is provided with capsule retention means 18, which are adapted to retain the capsules C in the respective sockets 14 up to the moment of expulsion.

With particular reference to FIGS. 4-7, the capsule retention means according to the disclosure comprise a duct 20 which is supplied with pressurized air and which

- has an arched profile around the axis of the wheel 12 and extends externally to the sockets 14 between the capsule loading position and the capsule release position,
- comprises a tube 24 which, at a lower end thereof, bifurcates into two branches 26, 28, between which the neck N of the bottle B is adapted to be inserted directly before the application of the capsule C, and
- is provided with a plurality of holes 22*a*, 22*b*, 22*c*, 22*d*, 22*e*, 22*f* which are directed inward in order to blow air in the direction of the open end 14*a* of the sockets 14 so as to retain the capsules inside them.

To be more precise, the tube 24 and the two branches 26, 28 have a rectilinear planar extension (FIG. 7) and are interconnected by a V-shaped connecting portion 30. The latter has two divergent mirror-like arms 32, 34, which, at the vertex of the V-shape, are connected to the tube 24, while they are connected to the branches 26, 28 respectively at the opposite ends.

In this embodiment, the two branches 26, 28 are parallel to the tube 24.

The holes are advantageously distributed over all of the duct 20.

The axes of the holes 22*a* in the tube 24 are arranged on the central plane Z (FIG. 6) of the duct 20 and advantageously are arranged so as to face coaxially the sockets 14, which in this portion of the stroke are oriented in a substantially radial direction.

The holes 22*b*, 22*c* on the two branches 26, 28 converge towards the central plane Z of the duct 20 and are advantageously arranged so that the projection of their axes on the central plane of the duct 20 is substantially coaxial to the sockets 14, following their rule of motion as determined by the above mentioned lever systems.

The holes 22*a* on the tube 24 and the holes 22*b*, 22*c* on the branches 26, 28 are substantially mutually equidistant.

Preferably, the holes on the connecting portion 30 are distributed in a Y-shaped pattern, with a first row of holes 22*d* the axes of which lie on the central plane Z of the duct 20 in alignment with the holes 22*a* on the tube 24, and bifurcates into two additional rows of holes 22*e*, 22*f* on the arms 32, 34, which advantageously converge toward the central plane of the duct in a manner similar to the holes 22*b*, 22*c* on the two branches 26, 28. Advantageously, the holes on the connecting portion 30 have a slightly denser distribution to the advantage of effectiveness of the capsule retention action in this region.

Preferably, the duct 20 is supplied with pressurized air by means of a first air intake 36 and a second air intake 38.

The first air intake 36 and the second air intake 38 can be advantageously supplied by two different sources S1, S2, which can be adjusted so as to render the airflow emitted by the holes substantially uniform over the entire duct 20.

Advantageously, the first air intake 36 is arranged at the free end of the tube 24, while the second air intake 38 is arranged at the opposite end of the tube 24, i.e., directly upstream of the connecting portion 30.

The duct is also provided with a bracket 40 for anchoring to the frame 13.

The size, number and the distance between the holes can be chosen on the basis of the dimensions of the duct 20, which in turn may vary as a function of the dimensions of the dispenser 10.

In the example described here, in which the duct 20 extends over a radius of approximately 260 mm, the holes in the tube 24 and in the branches 26, 28 are mutually equidistant by approximately 12 mm, while the holes in the connecting portion 30 are mutually slightly closer. Furthermore, in this embodiment the holes have a diameter of 1.5 mm.

The duct according to the disclosure can be advantageously made of synthetic material by additive manufacturing, also known as three-dimensional printing.

In operation, it has been observed also in practice that the duct 20 according to the disclosure makes it possible to retain effectively the capsule C inside the socket 14 until the moment of expulsion, avoiding damage and/or deformations which, in known systems, are caused by contact with mechanical stop elements.

It has also been observed that by supplying air at the same pressure in the two intakes 36, 38, the airflow emitted by all the holes is substantially uniform and constant. The position of the intakes described above helps to achieve this result.

The fork-like shape of the duct makes it possible to move closer and, in certain circumstances, even fit the socket onto the neck of the bottle without interference.

A further advantage of the duct according to the disclosure is that it is highly tolerant with regard to dimensional variations among the capsules, which, as is well-known to the person skilled in the art, normally occur when the production batch is changed and sometimes even within the same batch. This makes it possible to avoid operations for calibrating the sockets when the batch is changed and more generally to maintain a high and constant efficiency even within the same batch.

Furthermore, the described system has negligible maintenance costs.

FIGS. 8-11 show an alternative embodiment of the disclosure that is particularly suitable for large-diameter capsules.

This embodiment differs from the preceding one essentially in that the two branches 126, 128, instead of being parallel to the tube 124, diverge slightly (FIG. 11) so as to remain as close as possible to the neck of the bottle up to the moment of capsule insertion.

Some preferred embodiments of the disclosure have been described, but of course the person skilled in the art may apply various modifications and variations within the scope of the claims, particularly as regards the size, number and position of the holes, which can vary widely depending on the specific application.

The disclosures in Italian Patent Application No. 102019000016667 from which this application claims priority are incorporated herein by reference.

The invention claimed is:

1. A capsule dispenser for bottling lines comprising: a motorized wheel with a horizontal axis, which supports a plurality of sockets each provided with an open end, said sockets following one another in receiving respective capsules in a capsule loading position and expelling said capsules in a capsule releasing position, said sockets having said open ends directed outwardly between said capsule loading position and said capsule releasing position, further comprising a duct supplied with pressurized air, said duct comprising:

an arched profile arranged about the axis of the motorized wheel and extending externally to the sockets between the capsule loading position and the capsule releasing position, a tube which, at a lower end, bifurcates into two branches, between which a neck of a bottle is adapted to be inserted just before the application of the capsule, and a plurality of holes provided in said tube and in said two branches, said plurality of holes being directed inwardly to blow air in a direction of the open end of the sockets.

2. The capsule dispenser according to claim 1, wherein said tube and said two branches are interconnected by a V-shaped connecting portion which has two mirror-like diverging arms.

3. The capsule dispenser according to claim 1, wherein said tube has part of said plurality of holes, the axes of which lie on a central plane of the duct.

4. The capsule dispenser according to claim 3, wherein said two branches have part of said holes which have axes that converge toward the central plane of the duct.

5. The capsule dispenser according to claim 4, wherein said part of said holes of said connecting portion are distributed in a Y-shaped pattern, with axes of a first row of holes lying on the central plane of the duct, which bifurcates into two further rows of holes formed on arms and converge toward the central plane of the duct.

6. The capsule dispenser according to claim 1, wherein said duct is provided with two air intakes configured to be supplied by two different sources.

7. The capsule dispenser according to claim 6, wherein a first one of said at least two air intakes is arranged at an upstream end of the tube.

8. The capsule dispenser according to claim 7, wherein a second one of said at least two air intakes is arranged downstream of said first one of said at least two air intakes.

9. The capsule dispenser according to claim 1, wherein said two branches are parallel to said tube.

10. The capsule dispenser according to claim 1, wherein said two branches are divergent.

* * * * *